US006896461B2

(12) United States Patent
Fleydervish et al.

(10) Patent No.: US 6,896,461 B2
(45) Date of Patent: May 24, 2005

(54) SPRING FASTENER FOR SUBSTRATES OF VARIOUS THICKNESSES AND RESPECTIVE VEHICLES

(75) Inventors: Mark Fleydervish, Buffalo Grove, IL (US); Daniel James Dickinson, Arlington Heights, IL (US); Richard H. Ducato, Kenosha, WI (US)

(73) Assignee: E. Vassiliou Revo Cable Tryst, Newark, DE (US)

( * ) Notice: Subject to any disclaimer, the term of this patent is extended or adjusted under 35 U.S.C. 154(b) by 0 days.

(21) Appl. No.: 10/361,316

(22) Filed: Feb. 10, 2003

(65) Prior Publication Data

US 2004/0028498 A1 Feb. 12, 2004

Related U.S. Application Data

(60) Provisional application No. 60/401,263, filed on Aug. 6, 2002, and provisional application No. 60/403,202, filed on Aug. 13, 2002.

(51) Int. Cl.[7] .................................................. F16B 13/06
(52) U.S. Cl. ....................................... 411/55; 411/60.2
(58) Field of Search ........................... 411/55, 60.2, 61, 411/182, 183, 340, 344

(56) References Cited

U.S. PATENT DOCUMENTS

| 1,295,734 | A | | 2/1919 | Greubel |
| 1,336,162 | A | | 4/1920 | Royer et al. |
| 2,296,046 | A | | 9/1942 | Miller |
| 2,396,501 | A | | 3/1946 | Gibson |
| 2,601,803 | A | | 7/1951 | Newman |
| 2,745,305 | A | | 5/1956 | Gisondi |
| 3,148,579 | A | | 9/1964 | Giovannetti |
| 3,431,813 | A | | 3/1969 | Johnson |
| 3,550,499 | A | | 12/1970 | Eilenberger |
| 3,919,916 | A | | 11/1975 | Alexander |
| 4,009,634 | A | | 3/1977 | Barmore |
| 4,300,865 | A | | 11/1981 | Murray |
| 4,354,782 | A | | 10/1982 | Newport |
| 4,500,238 | A | | 2/1985 | Vassiliou |
| 4,765,788 | A | | 8/1988 | Nowak et al. |
| 4,874,277 | A | | 10/1989 | Nowak et al. |
| 4,941,340 | A | | 7/1990 | Nowak et al. |
| 5,100,273 | A | | 3/1992 | Vassiliou |
| 5,447,005 | A | | 9/1995 | Giannuzzi |
| 5,725,343 | A | | 3/1998 | Smith |
| 6,164,885 | A | * | 12/2000 | Roytberg et al. ......... 411/55 X |
| 6,250,864 | B1 | | 6/2001 | Vassiliou |
| 6,280,129 | B1 | | 8/2001 | Lowry et al. |
| 6,299,399 | B1 | * | 10/2001 | Smith et al. ............ 411/183 X |
| 6,379,092 | B1 | | 4/2002 | Patel et al. |
| 6,409,443 | B1 | * | 6/2002 | Lowry et al. .......... 411/60.2 X |
| 6,524,044 | B1 | * | 2/2003 | Vassiliou ............... 411/60.2 X |
| 6,709,210 | B2 | * | 3/2004 | Lowry et al. .......... 411/60.2 X |

FOREIGN PATENT DOCUMENTS

| FR | 1.219.317 | 12/1959 |
| GB | 711095 | 6/1959 |
| GB | 2027834 | 2/1980 |
| IT | 401379 | 1/1943 |
| JP | 46-17656 | 5/1971 |

* cited by examiner

Primary Examiner—William L. Miller
(74) Attorney, Agent, or Firm—E. Vassiliou

(57) ABSTRACT

This invention pertains fasteners which are characterized by adaptability of use with substrates, such as steel panels for example, of various thicknesses. This is achieved predominately by providing the fastener with legs having an origin section in the vicinity of the head of the fastener. Expansion promoters and/or anti-sliding elements improve considerably the separation resistance of objects connected with the fasteners of the present invention. Assemblies and vehicles comprising the spring fasteners of this invention, connecting two objects, one of the objects comprising a slot in which the fastener is inserted, and the other a hole, are also included within the scope of the instant invention. Provision of an elastic body in the vicinity of the bottom section of the fasteners provides water and gas proof properties, and further assist in the elimination of squeaking noises.

40 Claims, 3 Drawing Sheets

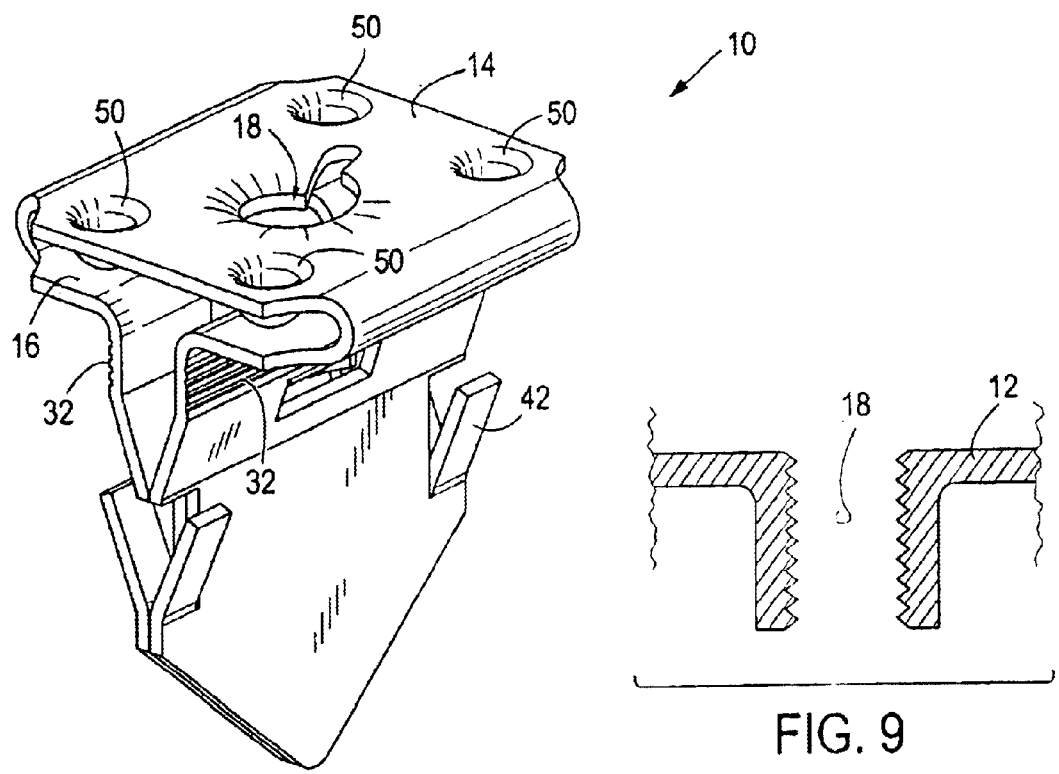
FIG. 7
FIG. 9
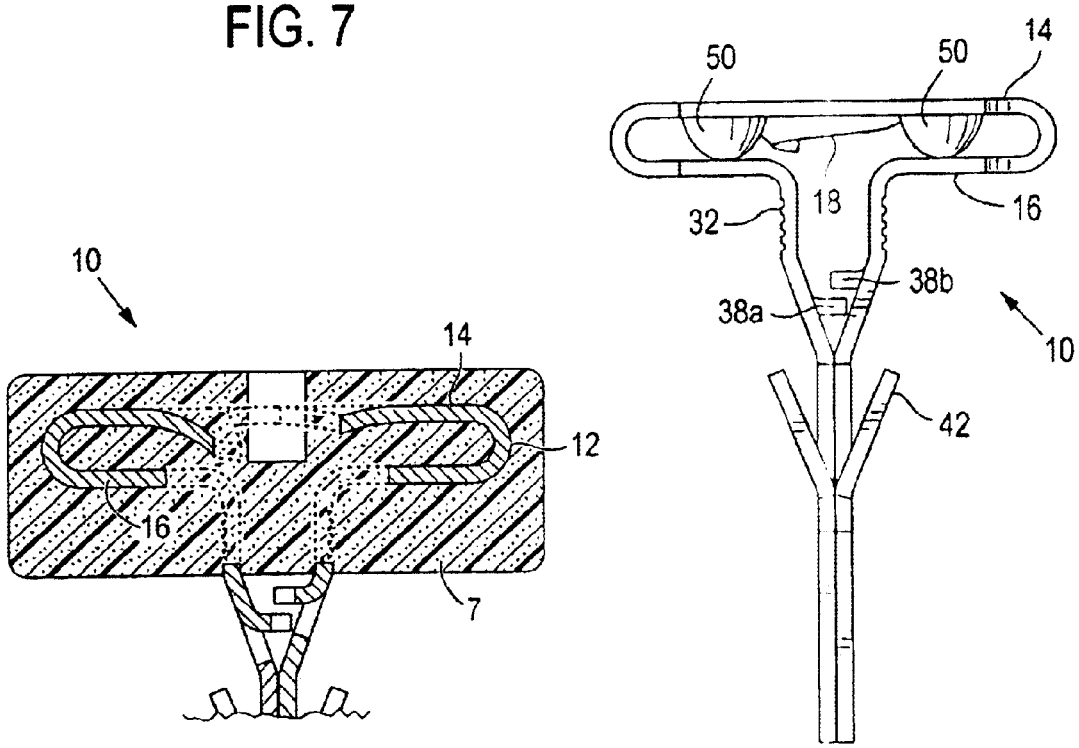
FIG. 10
FIG. 8

US 6,896,461 B2

SPRING FASTENER FOR SUBSTRATES OF VARIOUS THICKNESSES AND RESPECTIVE VEHICLES

RELATED APPLICATIONS

This application claims priority of provisional patent applications 60/401,263, filed Aug. 6, 2002, and 60/403,202, filed Aug. 13, 2002, both of which are incorporated herein by reference in their entirety.

FIELD OF THE INVENTION

This invention pertains fasteners, and more particularly fasteners which attach one object to another object, with special emphasis to objects in the Automotive Industry.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels.

Fasteners of the type described in U.S. Pat. No. 4,500,238 (Vassiliou), which is incorporated herein by reference, have been utilized to reduce considerably the potential of bolt or screw loosening and vibration. They have also eliminated the problem of having to place one member of the fastener at the back portion of the hollow object. These fasteners are placed through a slot from the front part of the hollow object or substrate. An expanding member, being usually a bolt or a screw, supports the second object by forcing the legs of the fastener (as described for example in U.S. Pat. No. 4,500, 238) to open or expand, thereby securing the two objects together. The legs of the fasteners are supported by a double-layered head having an upper side and a lower side joined by side bents. The fasteners of this type have greatly improved the prevailing torque, as well as the pulling force of the system. Prevailing torque is the torque required to render a screw loose. Pulling force is the pulling force applied on the screw to the point of failure, which usually occurs at the bents.

Other references representing the state of the art at this point are disclosed in U.S. Pat. Nos. 6,409,443, 6,379,092 B1, 6,299,399 B1, 6,280,129 B1, 6,250,864 B1, 5,725,343, 5,100,273, 4,941,340, 4,874,277, and 4,765,788, all of which are incorporated herein by reference.

Also fasteners of the general type are described in our pending patent application Ser. No. 09/699,760, filed Oct. 30, 2000, which is also incorporated herein by reference.

The fasteners disclosed in the above patents and application have some difficulty when designed to be secured in the slot of a substrate (which may also be referred to as a first object) having a certain thickness, and instead they are used in a substrate having a different thickness or different width. One such problem is rattling noises when the fasteners are used with a substrate which is thinner than the substrate that they have been designed for. Therefore there is a great need for a universal fastener of the general type described in the above patents, but being adaptable to be used with substrates having a broad range of thicknesses.

One of the objectives of this invention is to overcome this problem.

SUMMARY OF THE INVENTION

This invention pertains fasteners, and more particularly fasteners which attach one object to another object, with special emphasis to objects in the Automotive Industry. More particularly, this invention pertains a spring fastener comprising:

a double layered head portion having an upper side, and a lower side, the upper side having an engageable hole on which an expanding member can engage and pass through, the expanding member having a pitch; and a body portion extending from the lower side of the head portion, the body portion comprising two legs opposite to each other, each leg comprising an open neck, a respective substantially flat origin section originating from the head, and leaning at a lower point toward a respective substantially flat front portion away from the head, and wherein the respective origin sections of the legs are separated from each other by a first distance which is larger in the vicinity of the head than a second distance separating the respective front portions of said legs, the legs also comprising a contact region, on which contact region the expanding member exerts force causing said legs to expand when said expanding member is inserted into the fastener through the engageable hole.

It is preferable that the second distance has substantially a zero value, bringing the respective front portions in substantial contact.

It is also preferable that the origin sections are substantially perpendicular to the head as they initiate from said head and then lean toward each other as they progress to reach the respective front portions.

Each origin section has an open neck portion, which may have any desirable dimensions, including but not limited to an extremely narrow slot.

Each origin section also has an inner surface and an outer surface, which outer surface may have anti-sliding elements. Examples of such anti-sliding elements are ripples, bent teeth, general roughness, bumps, and any other configuration which will resist extraction of the fastener from the slot when said fastener is pulled away from the slot, especially after insertion of the expanding member.

Each one of the two origin sections may preferably have a respective expansion promoter. Preferably, the expansion promoters have a curved front segment, and they are disposed at a distance from each other, commensurate to the pitch of the expanding member.

The expansion promoters, are positioned most preferably within the contact region or between the contact region and the lower side of the head. In such a position, they prevent the head from bowing upon insertion of the engaging member. The contact region is the region which comes in contact with the expanding member for expanding the legs of the fastener. This arrangement prevents or at least hinders outward bowing of the upper side of the head of the fastener, since they prevent or at least hinder the outward force applied by the expanding member to said upper side of the head of the fastener, due to the engagement of the threads of the expanding member with said expansion promoters. Expansion promoters beyond the contact region do not provide this advantage, since the pressure to expand the legs is applied before engagement of the expansion promoters to the expanding member takes place. The same is true regardless of whether the particular structure described above is present or absent.

The engageable hole on the head may be made by impression providing a substantially single thread, which is more suitable for screws, or extrusion providing a multi-thread structures, which is more suitable for bolts.

Further, the fasteners of this invention may have barbs, which barbs prevent the fastener to fall out of the slot when initially inserted into said slot, and before the expansion member has been installed. The barbs may be conventional barbs, or as the barbs disclosed in provisional application 60/388,976 filed Jun. 14, 2002 and/or non-provisional application Ser. No. 10/209,765 filed Aug. 1, 2002, both of which are incorporated herein by reference. Further, the barbs may be divided into two pairs, each pair having barbs of substantially the same length, but the two pairs having two different lengths, the lengths of the diagonally disposed barbs being substantially the same while the lengths of the barbs disposed against each other being different. Both lengths may be such that allow at least one pair to fit under the metal or other sheet, onto which the fastener is engaged.

The fasteners of this invention may comprise head-side separators, which prevent the two sides of the head to come close together or in touch with each other, when adequately, high torques are applied to the expanding member. It was found that when the two sides approach each other, the fastener tends unexpectedly to become somewhat loose, a phenomenon which is corrected by the presence of the head-side separators.

The spring fasteners of this invention may further comprise an elastic body disposed at least under the lower side of the head portion, which elastic body provides sealing and/or sound reducing properties.

Vehicles comprising the spring fasteners of this invention, connecting two parts, one of the parts comprising a slot in which the fastener is inserted, are also included within the scope of the instant invention. Thus, automobiles or other vehicles may be made, comprising one or more of the fasteners of the instant invention, providing substantial improvements regarding safety, performance and comfort.

BRIEF DESCRIPTION OF THE DRAWING

The reader's understanding of this invention will be enhanced by reference to the following detailed description taken in combination with the drawing figures, wherein:

FIG. 7 illustrates a perspective view of a fastener in another preferred embodiment of the present invention wherein the head comprises head-side separators.

FIG. 8 illustrates a side view of a fastener of FIG. 7.

FIG. 9 illustrates a cross sectional view of an extruded multi-thread engageable hole.

FIG. 10 illustrates a fragmental cross-sectional view of a fastener according to another embodiment of the instant invention, wherein the fastener comprises an elastic body molded at least under the lower side of the head of the fastener of the present invention.

DETAILED DESCRIPTION OF THE INVENTION

Figure 1:
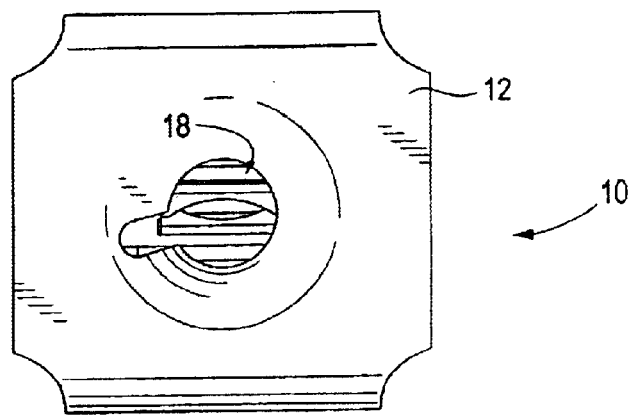
FIG. 1 illustrates a top view of a spring fastener according to a preferred embodiment of the present invention.
Figure 2:
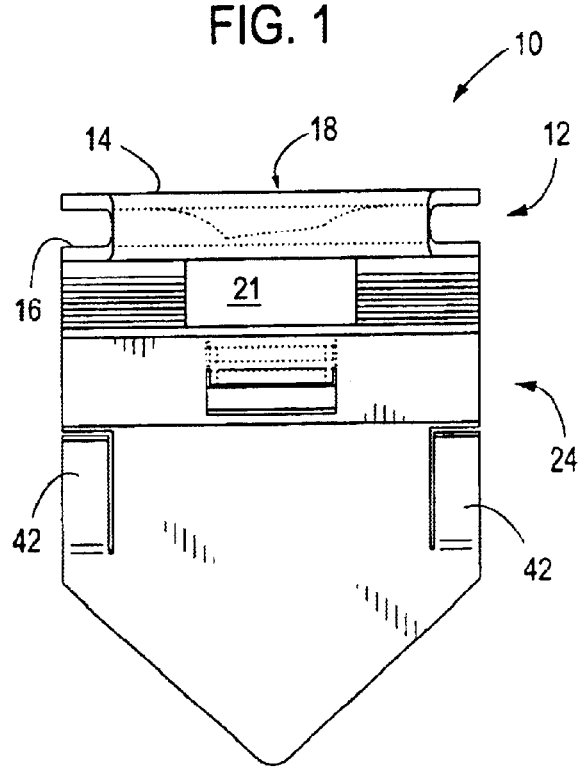
FIG. 2 illustrates a front view of the fastener, the top view of which is illustrated in FIG. 1.
Figure 3:
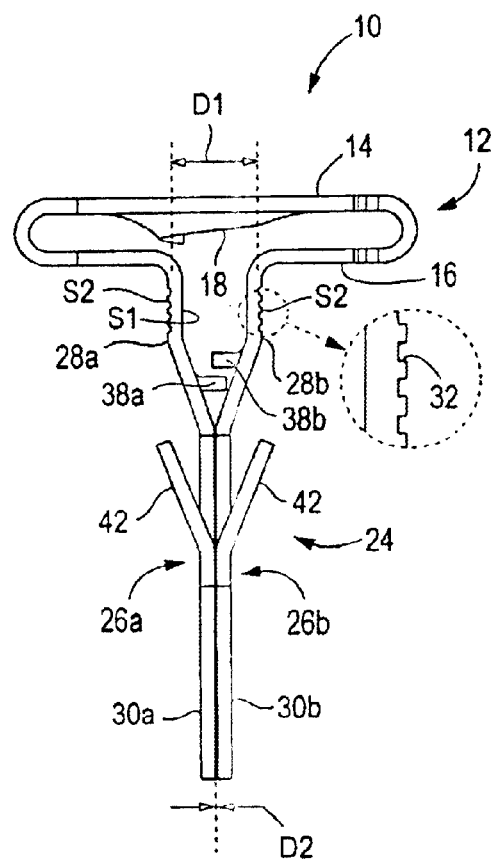
FIG. 3 illustrates a side view of the fastener, the top view of which is illustrated in FIG. 1.

As aforementioned, this invention pertains fasteners, and more particularly fasteners which attach one object to another object, with special emphasis to objects in the Automotive Industry.

As also mentioned earlier, there is a great need for a universal fastener of the general type described in the above patents, but being adaptable to be used with substrates having a broad range of thicknesses.

This invention provides fasteners which have the configurations required to satisfy the above need.

Referring now to FIGS. 1 to 6, there is depicted, a spring fastener 10 according to a preferred embodiment of the instant invention. The fastener 10 comprises a double layered head portion 12, which has an upper side or layer 14, and a lower side or layer 16. The upper side 12 has an engageable hole 18 on which an expanding member 20 (shown in FIG. 6) can engage and pass through. The expanding member 20 has a pitch 22, which is defined as the distance between two consecutive threads (shown also in FIG. 6). Examples of expanding members are screws, bolts, etc.

The spring fastener 10 further has a body portion 24 extending from the lower side 16 of the double layered head portion 12. The body portion 24 has two legs 26a and 26b (collectively 26) opposite to each other.

Each leg 26 has a respective origin section 28a and 28b (collectively 28) in the vicinity of the head 12 and a respective front portion 30a and 30b (collectively 30) away from the head 12. The respective origin sections 28 of the legs are separated from each other in the vicinity of the head by a first distance D1, which is preferably larger than a second distance D2 separating the respective front portions 30 of said legs 26.

It is more preferable that the second distance D2 has substantially a zero value, bringing the respective front portions 30 in substantial contact.

Each leg 26 has an open neck portion 21, within the origin section 28, which open neck portion 21 may have any desirable dimensions, including but not limited to an extremely narrow slot.

It is also preferable that the origin sections 28 are substantially perpendicular to the head 12 as they initiate from the lower side 16 of the head 12 and then lean toward each other at a later point as they progress to reach the respective front portions 26.

Each origin section 26 has an inner surface S1 and an outer surface S2, which outer surface S2 may preferably have anti-sliding elements 32. Examples of such anti-sliding elements 32 are ripples, bent teeth, general roughness, bumps, and any other configuration which will resist extraction of the fastener 10 from a slot 34 of a substrate (or first object) 36 (see FIG. 4), when said fastener 10 is pulled away from the slot 34, especially after insertion of the expanding member 20 (see FIG. 6). Substrates or first objects are usually panels, such as metal sheets for example, having a thickness T and slots 34 with a width W (see FIG. 4).

Figure 4:
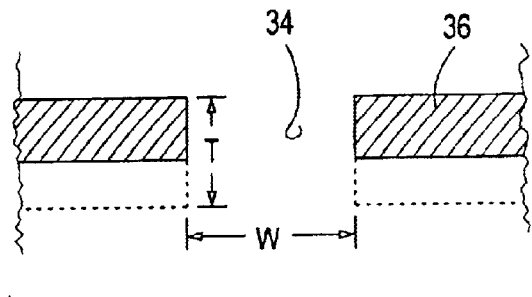
FIG. 4 illustrates a cross-sectional view of substrates with a slot, which substrates may have different thicknesses, as indicated by the solid and dotted lines.
Figure 5:
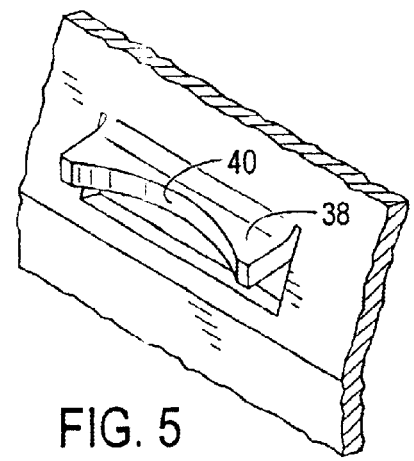
FIG. 5 illustrates a fractional perspective view of an example of an expansion promoter.
Figure 4A:
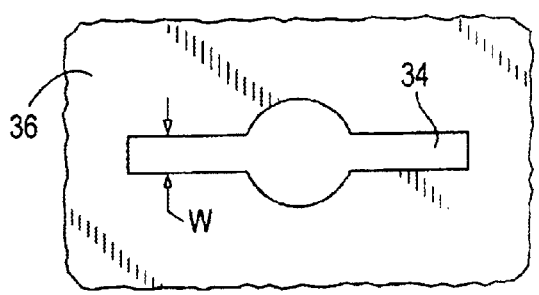
FIG. 4A illustrates a top view of an example of a slot of FIG. 4.
Figure 6:
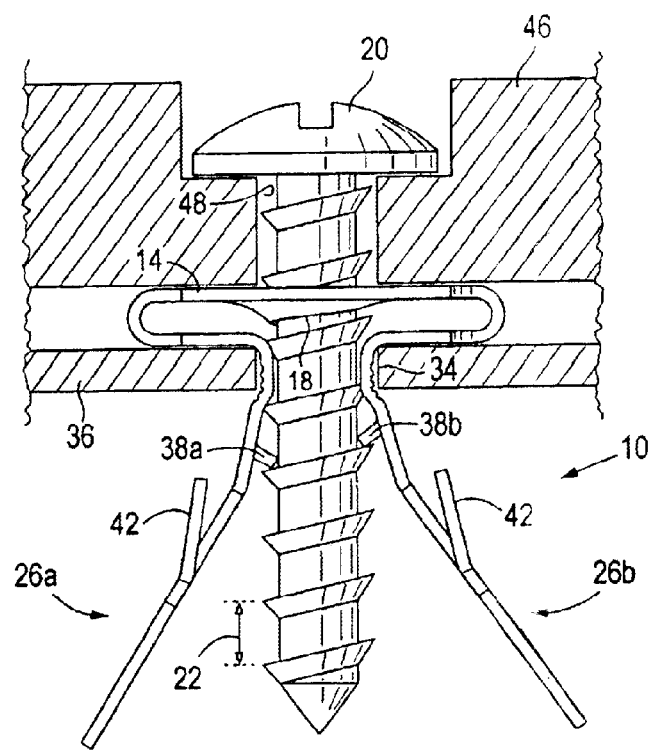
FIG. 6 illustrates the operation of the fasteners of the instant invention.

The slot 34 has preferably an oblong shape with a round hole in the middle, as better illustrated in FIG. 4A. The round hole allows the expanding member to move through the slot freely without interference from the walls of the slot, especially if the substrate or first object 36 is too thick and/or too hard.

Examples of anti-sliding configurations, and more details regarding their structure, as well as other types of spring fasteners having snapping segments are disclosed in provisional applications 60/246,634 (filed Nov. 8, 2000), 60/249, 996 (filed Nov. 20, 2000), 60/267,281 (filed Feb. 8, 2001), 60/283,286 (filed Apr. 12, 2001), 60/289,343 (filed May 7, 2001), 60/302,194 (filed Jun. 29, 2001), 60/301,164 (filed Jun. 25, 2001), 60/308,921 (filed Jul. 31, 2001), 60/310,343 (filed Aug. 6, 2001), and 60/312,867 (filed Aug. 16, 2001), all of which are incorporated herein by reference.

Each one of the two origin sections 28 may have a respective expansion promoter 38a and 38b (collectively 38). Preferably, the expansion promoters 38 have a curved front segment 40, and they are disposed at a distance from each other, commensurate to the pitch 22 of the expanding member 20. The expansion promoters 38 may originate from a position on the side of the head 10, of from a position on the side of the respective front portions 30.

Further, the fasteners 10 of this invention have barbs 42, which barbs 42 prevent the fastener 10 to fall out of the slot 34 when initially inserted into said slot 34, and before the expansion member 20 has been installed.

The spring fasteners 10 of this invention may further comprise an elastic body 7, as better illustrated in FIG. 10, disposed at least under the lower side 16 of the head portion 12. Examples of fasteners comprising such elastic bodies are given in U.S. Pat. Nos. 6,379,092 B1 and 5,725,343, both of which are incorporated herein by reference.

In operation, the fastener 10 (see FIG. 3 for example) is inserted into a slot 34 of a substrate 36 (FIG. 4). The combination of solid and slotted lines in FIG. 4 illustrates an example of different thicknesses of the substrate 36.

In sequence, the expanding member 20 (such as a screw for example) is passed through a hole 48 (see FIG. 6) of a second object 46, and then engaged and threaded through the engageable hole 18 of the upper side 14 of the fastener 10. When the expanding member 20 reaches the expansion promoters 38, the legs 26 (26a and 26b) start expanding and finally secure the fastener 10 on the substrate or first object 36. The second object 46 is secured on the fastener 10 by the expanding member 20. The final result is that the second object 46 is firmly secured on the substrate or first object 36 through this arrangement.

In the absence of expansion promoters 38, the leg portions 26 open or expand, anyway, when the expanding member 20 reaches a point where the distance separating the two leg portions 26 is smaller than the diameter of the expanding member 20 at the point of contact, or contact region. The point of contact, or contact region, is the region which comes in contact with the expanding member for expanding the legs of the fastener. However, the presence of the expansion promoters 38 causes the legs to expand considerably more, thus improving the expansion and separation resistance of the two objects to a high degree.

In addition, the expansion promoters 38, as aforementioned, are positioned most preferably within the contact region or between the contact region and the lower side 16 of the head 12. In such a position, they prevent the head 12 from bowing upon insertion of the expanding member 20. This arrangement prevents or at least hinders outward bowing of the upper side 14 of the head 12 of the fastener 10, since they prevent or at least hinder the outward force applied by the expanding member 20 to said upper side 14 of the head 12 of the fastener 10, due to the engagement of the threads of the expanding member with said expansion promoters 38. Expansion promoters 38 beyond the contact region do not provide this advantage, since the pressure to expand the legs 26 is applied when the expanding member 20 reaches the contact region, and before engagement of the expansion promoters t38 o the expanding member 20 takes place. The same is true regardless of whether the particular structure described above is present or absent.

If the second object 46 is pulled away from the first object 36, the opened leg portions 26 resist such separation. The presence of anti-sliding elements 32 on the second surface S2 (see FIG. 3) increases dramatically the separation resistance.

The particular shape of the origin section 28 increases considerably the adaptability of the fasteners to be used with substrates 36 of different thicknesses T. It similarly increases considerably the adaptability of the fasteners 10 to be used with slots 34 of different width W (see FIG. 4).

As aforementioned, the fasteners 10 of this invention may comprise head-side separators 50, as better shown in FIGS. 7 and 8. The head-side separators 50 prevent the upper side 14 and the lower side 16 of the head 12 to come close together or in touch with each other, when considerably high torques are applied to the expanding member 20. It was found that when the two sides 14 and 16 approach each other, the fastener tends unexpectedly to become somewhat loose, a phenomenon which is corrected by the presence of the head-side separators 50. The head-side separators 50 may originate from the upper side 14 (as illustrated in FIGS. 7 and 8), or the lower side 16 (not shown), or a combination thereof.

The head-side separators 50 may have any form, such as for example depressions, bumps, notches, cut and bent portions, etc. It is only important that they prevent or hinder the two sides 14 and 16 to approach or contact each other when considerably high torques are applied to the expanding member 20. Although considerably high torques are considered to be those over 25–30 inch pounds, the torque to be actually considered depends on the particular thickness, hardness and other characteristics of the fastener, as well as the particular application.

As aforementioned, the fasteners of this invention may have barbs, which barbs prevent the fastener to fall out of the slot when initially inserted into said slot, and before the expansion member has been installed. The barbs may be conventional barbs, or as the barbs disclosed in provisional application 60/388,976 filed Jun. 14, 2002 and/or non-provisional application Ser. No. 10/209,765 filed Aug. 1, 2002, both of which are incorporated herein by reference. Further, the barbs may be divided into two pairs, each pair having barbs of substantially the same length, but the two pairs having two different lengths, the lengths of the diagonally disposed barbs being substantially the same while the lengths of the barbs disposed against each other being different. Both lengths may be such that allow at least one pair to fit under the metal or other sheet, onto which the fastener is engaged.

The engageable hole 18 on the head 12 may be made by impression (as shown in FIGS. 7 and 8, for example) providing a substantially single thread, which is more suitable for screws, or by extrusion providing a multi-thread structure, well known to the art, which is more suitable for bolts. The cross section of an extruded multi-thread engageable hole is illustrated in FIG. 9.

Assemblies and vehicles comprising the spring fasteners of this invention, connecting two objects, one of the objects comprising a slot in which the fastener is inserted, and the other a hole, are also included within the scope of the instant invention. Thus, automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

Any feature(s) described in one of the exemplary embodiments may be combined with any features incorporated in any other exemplary embodiment according to this invention.

Although the feature(s) characterizing each particular embodiment are critical for said particular embodiment, equivalents are not meant to be excluded.

Any explanations given are speculative and should not restrict the scope of the claims.

What is claimed is:

1. A spring fastener comprising:
    a double layered head portion having an upper side, and a lower side, the upper side having an engageable hole on which a threaded expanding member can engage and pass through, the threaded expanding member having a pitch, the upper side and the lower side being separated by head-side separators, which prevent the two sides of the head to come close together or in touch with each other, when adequately high torques are applied by the threaded expanding member; and
    a body portion extending from the lower side of the head portion, the body portion comprising two legs opposite to each other, each leg comprising an open neck, a respective substantially flat origin section originating from the head, and leaning at a lower point toward a respective substantially flat front portion away from the head, and wherein the respective origin sections of the legs are separated from each other by a first distance which is larger in the vicinity of the head than a second distance separating the respective front portions of said legs, the legs also comprising a contact region, on which contact region the expanding member exerts force causing said legs to expand when said expanding member is inserted into the fastener through the engageable hole.

2. A fastener as defined in claim 1, wherein the origin sections are substantially perpendicular to the head as they initiate from said head and then lean toward each other as they progress to reach the respective front portions.

3. A fastener as defined in claim 2, wherein the second distance is substantially zero.

4. A fastener as defined in claim 3, wherein each one of the two origin sections comprises a respective expansion promoter.

5. A fastener as defined in claim 4, wherein the expansion promoters have a curved front segment, and they are disposed at a distance from each other, commensurate to the pitch of the expanding member.

6. A fastener as defined in claim 4, wherein the expansion promoters, are positioned within the contact region and the lower side of the head, including the contact region.

7. A fastener as defined in claim 3, further comprising an elastic body disposed at least under the lower side of the head of the fastener.

8. A fastener as defined in claim 3, wherein the engageable hole is selected from impression single-thread hole and extrusion multi-thread hole.

9. A fastener as defined in claim 3, further comprising barbs.

10. A fastener as defined in claim 2, wherein each origin section also has an inner surface and an outer surface, and the outer surface has anti-sliding elements.

11. A fastener as defined in claim 2, wherein each one of the two origin sections comprises a respective expansion promoter.

12. A fastener as defined in claim 11, wherein the expansion promoters have a curved front segment, and they are disposed at a distance from each other, commensurate to the pitch of the expanding member.

13. A fastener as defined in claim 11, wherein the expansion promoters, are positioned within the contact region and the lower side of the head, including the contact region.

14. A fastener as defined in claim 1, wherein the second distance is substantially zero.

15. A fastener as defined in claim 1, wherein each origin section also has an inner surface and an outer surface, and the outer surface has anti-sliding elements.

16. A fastener as defined in claim 1, wherein each one of the two origin sections comprises a respective expansion promoter.

17. A fastener as defined in claim 16, wherein the expansion promoters have a curved front segment, and they are disposed at a distance from each other, commensurate to the pitch of the expanding member.

18. A fastener as defined in claim 17, further comprising an elastic body disposed at least under the lower side of the head of the fastener.

19. A fastener as defined in claim 16, wherein the expansion promoters, are positioned within the contact region and the lower side of the head, including the contact region.

20. A fastener as defined in claim 1, further comprising an elastic body disposed at least under the lower side of the head of the fastener.

21. A vehicle comprising a spring fastener connecting two objects, one of the objects comprising a slot in which the fastener is inserted, and the other a hole, the spring fastener comprising:
    a double layered head portion having an upper side, and a lower side, the upper side having an engageable hole on which a threaded expanding member can engage and pass through, the threaded expanding member having a pitch, the upper side and the lower side being separated by head-side separators, which prevent the two sides of the head to come close together or in touch with each other, when adequately high torques are applied by the threaded expanding member; and
    a body portion extending from the lower side of the head portion, the body portion comprising two legs opposite to each other, each leg comprising an open neck, a respective substantially flat origin section originating from the head, and leaning at a lower point toward a respective substantially flat front portion away from the head, and wherein the respective origin sections of the legs are separated from each other by a first distance which is larger in the vicinity of the head than a second distance separating the respective front portions of said legs, the legs also comprising a contact region, on which contact region the expanding member exerts force causing said legs to expand when said expanding member is inserted into the fastener through the engageable hole.

22. A vehicle as defined in claim 21, wherein the origin sections of the legs of the fastener are substantially perpendicular to the head as they initiate from said head and then lean toward each other as they progress to reach the respective front portions.

23. A vehicle as defined in claim 22, wherein the second distance is substantially zero.

24. A vehicle as defined in claim 23, wherein each one of the two origin sections comprises a respective expansion promoter.

25. A vehicle as defined in claim 24, wherein the expansion promoters have a curved front segment, and they are disposed at a distance from each other, commensurate to the pitch of the expanding member.

26. A vehicle as defined in claim 24, wherein the expansion promoters, are positioned within the contact region and the lower side of the head, including the contact region.

27. A vehicle as defined in claim 22, wherein each origin section also has an inner surface and an outer surface, and the outer surface has anti-sliding elements.

28. A vehicle as defined in claim 22, wherein each one of the two origin sections comprises a respective expansion promoter.

29. A vehicle as defined in claim 28, wherein the expansion promoters have a curved front segment, and they are disposed at a distance from each other, commensurate to the pitch of the expanding member.

30. A vehicle as defined in claim 28, wherein the expansion promoters, are positioned within the contact region and the lower side of the head, including the contact region.

31. A vehicle as defined in claim 23, wherein the fastener further comprises an elastic body disposed at least under the lower side of the head of the fastener.

32. A vehicle as defined in claim 23, wherein the engageable hole is selected from impression single-thread hole and extrusion multi-thread hole.

33. A vehicle as defined in claim 23, wherein the fastener further comprises barbs.

34. A vehicle as defined in claim 21, wherein the second distance is substantially zero.

35. A vehicle as defined in claim 21, wherein each origin section also has an inner surface and an outer surface, and the outer surface has anti-sliding elements.

36. A vehicle as defined in claim 21, wherein each one of the two origin sections comprises a respective expansion promoter.

37. A vehicle as defined in claim 36, wherein the expansion promoters have a curved front segment, and they are disposed at a distance from each other, commensurate to the pitch of the expanding member.

38. A vehicle as defined in claim 36, wherein the expansion promoters, are positioned within the contact region and the lower side of the head, including the contact region.

39. A vehicle as defined in claim 36, wherein the fastener further comprises an elastic body disposed at least under the lower side of the head of the fastener.

40. A vehicle as defined in claim 21, wherein the fastener further comprises an elastic body disposed at least under the lower side of the head of the fastener.

* * * * *